United States Patent [19]

Hodge

[11] Patent Number: 5,053,656

[45] Date of Patent: Oct. 1, 1991

[54] SENSING RING FOR ROTATIONAL SENSING SYSTEM

[75] Inventor: Bobby L. Hodge, Charlotte, N.C.

[73] Assignee: INA Bearing Company, Inc., Fort Mill, S.C.

[21] Appl. No.: 452,007

[22] Filed: Dec. 18, 1989

[51] Int. Cl.$^5$ .................... H02K 19/20; G01P 3/488
[52] U.S. Cl. .................................. 310/42; 29/598; 310/168
[58] Field of Search .............. 29/598; 180/197; 188/181; 310/42, 43, 153, 155, 168, 261

[56] References Cited

U.S. PATENT DOCUMENTS

| | | | |
|---|---|---|---|
| 3,801,845 | 2/1974 | Gavitt, Sr. | 310/168 |
| 3,961,215 | 6/1976 | Gee et al. | 310/168 |
| 4,087,710 | 5/1978 | von Fabris et al. | 310/168 |
| 4,710,659 | 1/1987 | Takano et al. | 310/43 |
| 4,795,278 | 1/1989 | Hayashi | 310/155 |
| 4,797,611 | 1/1989 | Schreiber | 310/168 |
| 4,835,840 | 6/1989 | Stokes | 310/43 |
| 4,940,936 | 7/1990 | Grillo et al. | 310/156 |

Primary Examiner—R. Skudy
Assistant Examiner—D. L. Rebsch
Attorney, Agent, or Firm—Wigman & Cohen

[57] ABSTRACT

A thin, metallic sensor ring for rotational sensing systems wherein protrusions formed on the periphery of the ring are constructed so as to interrupt an electromagnetic flux emitted by a sensing device mounted in fixed relation to the ring, whereby rotation of the ring may be detected. The protrusions are formed without removing any metal from the ring, preferably by a stamping or drawing operation. Slits may be provided in the ring to facilitate the formation of the protrusions. The ring may be partially encapsulated in a plastic mounting adapter to facilitate mounting thereof on a rotating shaft or hub.

14 Claims, 1 Drawing Sheet

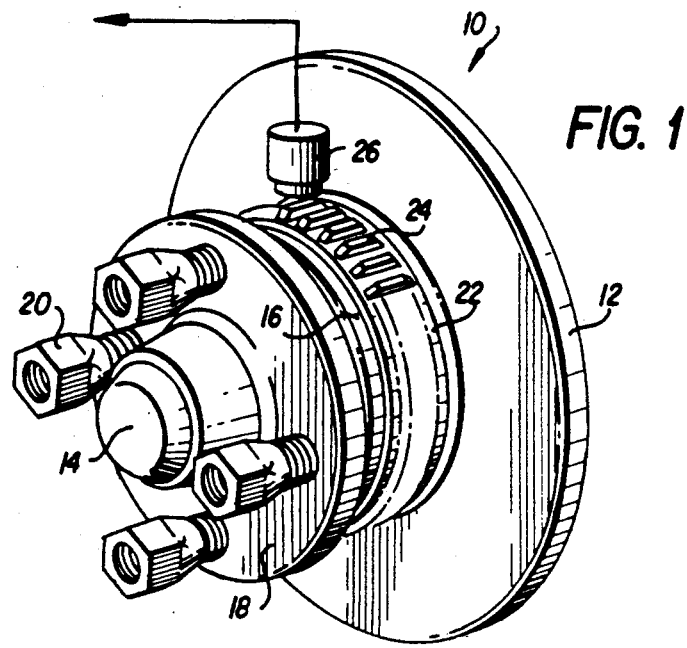
FIG. 1
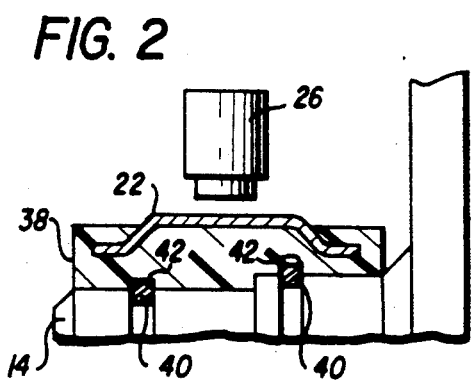
FIG. 2
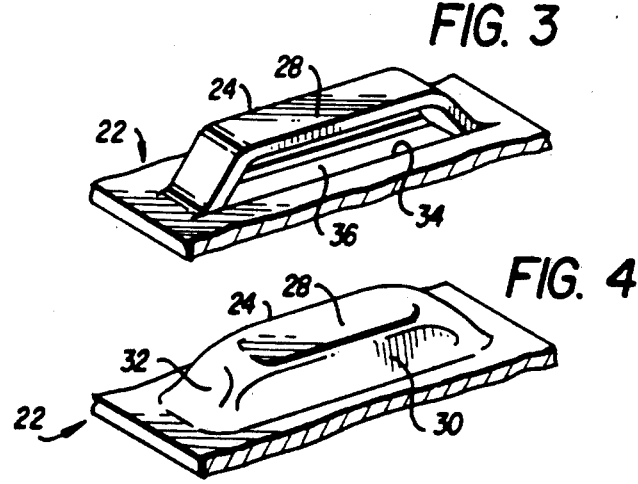
FIG. 3
FIG. 4
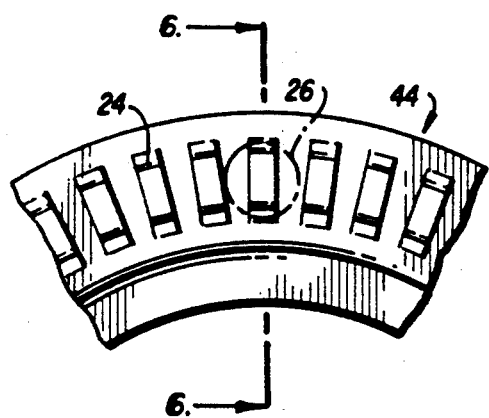
FIG. 5
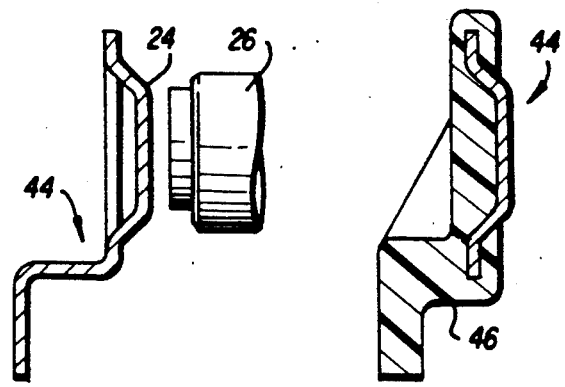
FIG. 6
FIG. 7

SENSING RING FOR ROTATIONAL SENSING SYSTEM

This invention relates generally to the automotive arts, and more particularly to an improved sensing ring for use in a rotational sensing device for anti-lock vehicle braking systems and the like.

Rotational sensing devices have a variety of applications in the automotive arts. For example, in anti-lock braking systems it is necessary to determine whether the driven wheels of the vehicle have locked or stopped rotating during braking so that a conventional computer-controlled pulsed braking mechanism may be automatically activated. Other automotive applications include devices for sensing the rate of rotation of automatic transmission drive shafts so as to determine the shift points, as well as in "drive-by-wire" steering systems and electronic tachometers.

Typically, such rotational sensing devices utilize a sensing or counting ring — also referred to as a tone wheel or pulser gear — consisting of an annular body constructed from a ferrous material, normally steel, having gear teeth formed on its periphery. The annular body is mounted on the outer periphery of the rotating member in close proximity to an electromagnetic sensing device which emits a magnetic flux in the direction of the annular body. As the rotating member rotates past the sensing device the gear teeth formed in the annular body cause changes in the magnetic flux, thereby permitting the rotation of the rotating member to be detected.

The gear teeth or conventional sensing or counting rings are normally produced by a machining operation, such as a gear cutting machine or by sintering. However, because of the relatively high cost of such machining operations, and because sintered constructions have relatively low strength and thus require close tolerances for press fitting on the rotating member, such conventional constructions are not totally satisfactory.

U.S. Pat. No. 4,795,278 to Hayashi discloses a device which attempts to overcome the problems inherent in conventional sensing rings by eliminating the gear tooth construction and providing a ring having a plurality of punched through holes formed in and spaced circumferentially about its periphery, thereby presenting a plurality of alternating recesses and ribs formed by the metal left in the ring between adjacent recesses. In operation, as the sensing ring is rotated the alternating recesses and ribs cause changes in the magnetic flux emitted by the electromagnetic sensor, thereby permitting rotation of the ring to be detected.

While the Hayashi device alleviates the expense associated with machining gear teeth on a sensing ring as well as the structural concerns associated with a sintered ring, a sensing ring as disclosed in the Hayashi patent must be fabricated from a relatively thick piece of sheet stock (approximately at least 2 mm) in order to provide the necessary structural integrity to accommodate the punch through holes. Moreover, a sufficient thickness is necessary in order for the electromagnetic sensing device to differentiate between the ribs formed between the recesses and the metal of the mounting shaft or hub which underlies each of the recesses and which confronts the sensing device as the ring rotates. Furthermore, because of the numerous crevices and openings formed in the Hayashi sensing ring, it is necessary to encapsulate it in plastic to provide corrosion resistance against the environmental elements that normally would be encountered in anti-lock braking system applications. Such plastic encapsulation, of course, increases the cost of the device.

In view of the foregoing problem and limitations associated with the prior art, it should be apparent that a need still exists in the art for a sensor ring that is economical to manufacture, has structural integrity, and which avoids the problems associated with conventional devices of this type.

SUMMARY OF THE INVENTION

It is, therefore, a primary object of this invention to provide a sensor ring for use in a rotational sensing system that can be fabricated without an expensive machining operation.

Another object of this invention is to provide a sensor ring for use in a rotational sensing system that has good structural integrity yet can be fabricated from relatively thin sheet metal.

Yet another object of this invention is to provide a sensor ring for use in a rotational sensing system that is formed as a continuous piece of sheet metal without recesses or windows formed therein.

A further object of this invention is to provide a sensor ring for use in a rotational sensing system that does not require encapsulation in plastic to resist corrosion.

Still another object of this invention is to provide a sensor ring for use in a rotational sensing system having a plurality of spaced protrusions formed therein which may be readily sensed and differentiated by an electromagnetic sensor.

An additional object of this invention is to provide an economical method of fabricating a sensor ring for use in a rotational sensing system.

These and other objects and advantages which may become apparent hereinafter are accomplished in accordance with this invention by providing a sensor ring that is fabricated from a thin strip of sheet metal having a plurality of protrusions formed therein without removing any metal from the strip. The protrusions are spaced along the length of the strip such that — when the strip is bent into the shape of a ring — the protrusions extend radially outwardly thereof thereby providing a series of alternate interruptions to an electromagnetic flux emitted by a sensing device mounted in proximity thereto in a manner similar to that provided by the machined or sintered gear teeth of the aforementioned prior art sensor rings. The protrusions may be formed by any conventional forming operation, such as stamping or drawing.

The use of protrusions in accordance with the present invention permits the sensor ring to be fabricated from a much thinner and lighter gauge metal than the sensor ring of the Hayashi patent. Since metal is removed from the Hayashi ring in forming the windows or punch through holes therein, it must be constructed from a relatively heavy gauge metal so as to provide the necessary structural integrity to the ring. On the other hand, because of its formed construction, and because no metal is removed therefrom, the sensor ring of this invention has sufficient structural integrity and rigidity even when manufactured from thin gauge metal less than 2 mm thick.

Moreover, as discussed above, the sensor ring of the Hayashi patent must be sufficiently thick in order for the electromagnetic sensing device to differentiate between the alternate recesses and ribs formed therein. By contrast, the tops or lands of the protrusions formed in the sensor ring of the present invention can extend a sufficient distance from the base of the ring so as to provide the necessary interruption in the electromagnetic flux to enable detection by the sensor as the ring rotates. It should be apparent that this can be accomplished with a relatively thin gauge metal as compared with the metal ring disclosed in the prior art Hayashi patent.

In order to facilitate the formation of the protrusions the strip of sheet metal may be first provided with a plurality of transverse slits between which the protrusions are then formed. In this configuration the flanks or sides of the protrusions would be open and the top lands thereof would be substantially flat, with relatively sharp edges, thereby providing a more precise fluctuation in the electromagnetic flux approaching a step function.

Furthermore, in order to facilitate mounting of the sensor ring on a shaft or hub, it may be partially encapsulated in a plastic mounting adapter. This type of construction permits a much greater manufacturing tolerance in the shaft or hub upon which the sensor ring is mounted.

In an alternate embodiment of the invention the sensor ring may be fabricated by providing an annular ring of thin sheet metal, such as by stamping it from a blank, and then forming a plurality of protrusions in the ring which are angularly spaced around the periphery thereof. In this embodiment the electromagnetic sensing device would be mounted parallel to the axis of rotation of the ring.

With the above and other objects and advantages which may become apparent hereinafter, the nature of the invention may be more clearly understood from the attached drawings, the following detailed description thereof, and the appended claimed subject matter.

BRIEF DESCRIPTION OF THE DRAWINGS

FIG. 1 is a perspective view of a disk brake for a vehicle wheel, and illustrates the sensor ring of this invention mounted on the hub of the wheel;

FIG. 2 is a partial sectional view taken through one of the protrusions of the sensor ring, and illustrates the ring partially encapsulated in a plastic adapter which is mounted on the hub of a wheel;

FIG. 3 is a fragmentary perspective view of a single protrusion of the sensor wheel, and illustrates the sides or flanks of the protrusion being open;

FIG. 4 is a fragmentary perspective view of one protrusion of the sensor ring of this invention, and illustrates the sides or flanks of the protrusion being closed;

FIG. 5 is a fragmentary elevation view of an alternate embodiment of the sensor ring of this invention, wherein the protrusions are angularly spaced around the periphery thereof;

FIG. 6 is a sectional view taken along line 6—6 of FIG. 5; and

FIG. 7 is a sectional view illustrating the sensor ring of FIG. 5 partially encapsulated in a plastic adapter.

DETAILED DESCRIPTION OF THE PREFERRED EMBODIMENTS

Referring now to the drawings in detail, there is illustrated in FIG. 1 a portion of an anti-lock braking system for a vehicle wheel generally designated by the numeral 10. The braking system 10 includes a brake rotor 12 mounted on a wheel hub 14. A sleeve 16 is splined or press-fit on the hub 14, and retained thereon by a plate 18, which is fastened to the sleeve 16 by means of a plurality of bolts 20.

A sensor ring 22 constructed in accordance with this invention is mounted on the sleeve 16 in any suitable manner. The sensor ring 22 includes a plurality of protrusions 24 spaced about the periphery thereof. (For convenience, only a limited number of the protrusions 24 are illustrated in FIG. 1.) A conventional electromagnetic sensor 26 is mounted in fixed position adjacent to and in close proximity to the sensor ring 22. The electromagnetic sensor 26 is adapted to emit an electromagnetic flux in the direction of the sensor ring 22 which is interrupted by the protrusions 24 as the sensor ring 22 rotates. The interruption in the magnetic force is detected by the sensor 26, thereby permitting the sensor 26 to determine whether the sensor ring 22 is rotating. In a conventional anti-lock braking system the signals transmitted by the sensor 26 are processed by a computer which controls the braking operation. It should be understood, however, that the sensor ring 22 of this invention is not limited to use in anti-lock braking systems, but may be used in other automotive applications, as well as in various other rotational sensing systems. As seen most clearly in FIG. 4, the protrusions 24 have the general of a frustum of a right triangular prism with a top or land 28, sides or flanks 30, and ends 32. The protrusions 24 are formed by any conventional forming operation, such as stamping or drawing, without removing any metal from the ring 22. The protrusions are of a depth such that the vertical distance from the land 28 to the base of the ring 22 provides sufficient interruption of the electromagnetic force as to be sensed by the sensor 26 as the ring 22 rotates.

A modification of the sensor ring 22 is illustrated in FIG. 3 wherein slits 34 are provided in the ring 22 so as to facilitate formation of the protrusions 24. By providing such slits 34 openings 36 are formed in the sides of the protrusion 24 rather than the metal flanks 38 illustrated in FIG. 4.

By providing the slits 34 the lands 28 become substantially flat and the protrusions 24 have a much sharper configuration overall than the more rounded configuration of the FIG. 4 embodiment. The flatened lands 28 thus provide a more precise fluctuation in the electromagnetic flux (approaching a step function) as the sensor ring 22 rotates past the sensor 26.

Turning now to FIG. 2, the sensor ring 22 is illustrated as being partially encapsulated in a plastic adaptor ring 38. The plastic adaptor ring 38 facilitates mounting of the sensor ring 22 on the hub 14. O-rings 40, which may be received in grooves 42 formed in the undersurface of the adaptor ring 38, function to retain the adaptor ring 38 on the hub 14. Because of the plastic adaptor ring 38, there is a greater flexibility in mounting the ring 22 without the necessity of maintaining close dimensional tolerances on the hub 14.

Referring now to FIG. 5, there is illustrated an alternate embodiment of the sensor ring of this invention designated generally by the numeral 44. The sensor ring 44 is configured as an annular ring which may be stamped out of a blank of sheet metal. The sensor ring 44 includes a plurality of protrusions 24 formed therein and angularly spaced about the periphery thereof. The protrusions 24 may be formed with trapeziodal open sides by first slitting or lancing the metal as illustrated in FIG. 3, or with closed sides as illustrated in FIG. 4. In the FIG. 5 embodiment of the invention the electromagnetic sensor 26 is mounted adjacent the sensor ring 44 and is oriented parallel to the axis of rotation of the sensor ring 44 as illustrated most clearly in FIG. 6.

FIG. 7 illustrates the sensor ring 44 as partially encapsulated in a plastic mounting adaptor 46 by means of which the sensor ring 44 is mounted on the rotating hub or shaft 14.

If desired, the protrusions 24 may be coded by varying the heights and/or configurations thereof, thereby providing the system with the capability of sensing angular position as well as rotation. This would be particularly useful in steering columns of automotive vehicles. Moreover, since the sensing ring 22 is constructed from a thin gauge metal, an annular flange could be formed therein to serve as a positive stop in mounting the ring on the end of a hub. Additionally, other legs or appendages could be provided to enhance the mounting characteristics and adaptability of the device.

Because the sensing ring 22 of this invention does not have metal removed therefrom as in the prior art punched through construction, there are no crevices or recesses which are subject to corrosion. Consequently, it is not necessary to encapsulate the entire ring in plastic. The plastic mounting adaptor 38 provided in accordance with this invention is used primarily to facilitate mounting of the sensor ring 22 on the rotating member, rather than to inhibit corrosion. If corrosion does prove to be a problem, this can be solved by fabricating the ring 22 from a non-corrosive steel, such as a magnetic stainless steel or, alternatively, to provide a rust-preventative coating to a standard carbon steel.

It should be apparent, therefore, that there is provided in accordance with this invention a novel and improved sensing ring for use in rotary sensing systems that offers substantial advantages over the known prior art. Moreover, although only preferred embodiments of the invention have been specifically illustrated and described herein, it should be understood that many modifications could be made without departing from the spirit and scope of the invention as set forth in the following claims.

What is claimed is:

1. A sensor ring for use in a rotational sensing system having means spaced along the periphery thereof capable of being detected by an electromagnetic sensor positioned in proximity thereto whereby rotation of said ring may be determined;
   wherein said sensor ring is constructed from a metal sheet having two parallel ledges and said means spaced along the periphery thereof comprise a plurality of drawn concave protrusions formed on one side of said metal sheet and spaced inwardly from each of said edges; and
   wherein slits are provided in said metal sheet to facilitate drawing of said metal sheet to form said protrusions.

2. A rotational sensing system comprising:
   a sensor ring mounted for rotation about an axis;
   an electromagnetic sensor positioned in proximity to said sensor ring for detecting rotation thereof;
   said electromagnetic sensor including means for emitting an electromagnetic flux;
   a plurality of protrusions formed in said sensor ring for causing fluctuation in said electromagnetic flux as said sensor ring rotates in a direction past said electromagnetic sensor;
   said protrusions having a substantially flat rectangular land, two open trapeziodal sides, and two rectangular ends; and
   wherein said protrusions are arranged with said open sides adjacent one another in the direction of rotation of said sensor ring whereby the fluctuation in the electromagnetic flux as said sensor ring rotates is substantially in the form of a step function.

3. A sensor ring according to claim 1 wherein said protrusions have a generally rectangular configuration.

4. A sensor ring according to claim 1 wherein the configurations of said protrusions are varied whereby the angular position of said ring may be determined.

5. A sensor ring according to claim 1 wherein said protrusions extend radially of the axis of rotation of said ring.

6. A sensor ring according to claim 1 wherein said protrusions extend in the direction of the axis of rotation of said ring.

7. A sensor ring according to claim 1 wherein said ring is partially encapsulated in plastic to facilitate mounting thereof on a shaft.

8. A sensor ring according to claim 1 wherein said metal sheet is less than 2 mm thick.

9. A sensor ring according to claim 1 wherein said protrusions have the general configuration of a frustum of a right triangular prism.

10. A sensor ring according to claim 1 wherein the depths of said protrusions are varied whereby the angular position of said ring may be determined.

11. A sensor ring for use in a rotational sensing system having means spaced along the periphery thereof capable of being detected by an electromagnetic sensor positioned in proximity thereto whereby rotation of said ring may be determined;
    said sensor ring being constructed from a metal strip and including means for interrupting a magnetic flux as said ring rotates;
    said interrupting means comprising a plurality of protrusions having substantially flat lands disposed in a plane substantially parallel to the plane of said strip, two open sides, and two closed ends inclined to the plane of said strip; and
    said protrusions being formed by providing a plurality of parallel slits in said strip and drawing the metal between pairs of said slits out of the plane of said strip.

12. A sensor ring according to claim 11 wherein said slits are disposed substantially perpendicular to the direction of rotation of said ring.

13. A sensor ring according to claim 11 wherein said slits are radially formed in said ring.

14. A sensor ring according to claim 11 wherein said slits are axially formed in said ring.

* * * * *

UNITED STATES PATENT AND TRADEMARK OFFICE
CERTIFICATE OF CORRECTION

PATENT NO. : 5,053,656
DATED : October 1, 1991
INVENTOR(S) : Bobby L. HODGE It is certified that error appears in the above-identified patent and that said Letters Patent is hereby corrected as shown below:

Column 4, line 27, after "general" insert --configuration--;
          line 39, after "34" insert --trapezoidal--;
          line 54, after "38" delete the ",";
          line 66, "trapeziodal" should be --trapezoidal--.

IN THE CLAIMS:

Claim 1, column 5, line 50 "ledges" should be --edges--.

Claim 2, column 6, line 8, "trapeziodal" should be --trapezoidal--.

Signed and Sealed this

Sixteenth Day of February, 1993

*Attest:*

STEPHEN G. KUNIN

*Attesting Officer*      *Acting Commissioner of Patents and Trademarks*